(12) United States Patent
Hunt et al.

(10) Patent No.: US 9,489,923 B2
(45) Date of Patent: Nov. 8, 2016

(54) SYNCHRONIZATION OF VIDEO WALL MOVEMENT WITH CONTENT ON THE WALL

(75) Inventors: Mark A. Hunt, Derby (GB); Matt Corke, Bloomfield, NJ (US); Mike Wyatt, Closter, NJ (US); John Hennessey, Oakland, NJ (US); Dhruveshkumar Brahmbhatt, Newburgh, NY (US)

(73) Assignee: Production Resource Group, LLC, New Windsor, NY (US)

( * ) Notice: Subject to any disclaimer, the term of this patent is extended or adjusted under 35 U.S.C. 154(b) by 1215 days.

(21) Appl. No.: 13/209,550

(22) Filed: Aug. 15, 2011

(65) Prior Publication Data

US 2012/0038600 A1 Feb. 16, 2012

Related U.S. Application Data

(60) Provisional application No. 61/374,156, filed on Aug. 16, 2010.

(51) Int. Cl.
*G09G 5/32* (2006.01)
*G06F 3/14* (2006.01)

(52) U.S. Cl.
CPC ............... *G09G 5/32* (2013.01); *G06F 3/1446* (2013.01)

(58) Field of Classification Search
CPC ............... F21W 2131/406; F21Y 2101/02; G09G 5/00; G09G 5/32; G06F 3/1446
USPC .............. 345/1.1–2.3, 204; 40/421, 446–537
See application file for complete search history.

(56) References Cited

U.S. PATENT DOCUMENTS

| 4,593,357 | A | * | 6/1986 | Van Ostrand et al. ........... 701/1 |
| 5,923,307 | A | * | 7/1999 | Hogle, IV .......................... 345/4 |
| 7,792,412 | B2 | * | 9/2010 | Nishitani ...................... 345/1.1 |
| 2002/0070689 | A1 | * | 6/2002 | Hunt et al. .................... 315/312 |
| 2002/0135731 | A1 | * | 9/2002 | Wolfe ........................... 349/192 |
| 2008/0136796 | A1 | * | 6/2008 | Dowling ....................... 345/204 |
| 2009/0235329 | A1 | * | 9/2009 | Chavez et al. .................... 726/3 |
| 2012/0092234 | A1 | * | 4/2012 | Trooskin-Zoller et al. ... 345/1.3 |

OTHER PUBLICATIONS

Art-Net II, Specification for the Art-Net II Ethernet Communication Standard, Art-Net II Protocol Release V1.4, Document Revision 1.4an Jan. 8, 2010, pp. 1-36.

* cited by examiner

*Primary Examiner* — Charles Hicks
(74) *Attorney, Agent, or Firm* — Law Office of Scott C Harris, Inc

(57) ABSTRACT

A controlling console and media server, and winch moving console all work together.

25 Claims, 2 Drawing Sheets

SYNCHRONIZATION OF VIDEO WALL MOVEMENT WITH CONTENT ON THE WALL

This application claims priority from 61/374,156, filed Aug. 16, 2010, the entire contents of which are herewith incorporated by reference.

BACKGROUND

Today's stage systems often include multiple different pieces of equipment which are connected together in a number of different ways. For example, a stage lighting system may include lights and props, a number of trusses, winches, and other devices which operate together in a specified way.

Systems which automatically attempt to sync movement of the video wall with movement of scenery have been created by United Visual Artists under their D3 line, and also have been created by Green Hippo products.

SUMMARY

The present application describes a system for moving a video wall that operates with multiple different pieces of equipment to synchronize the operation of those multiple different pieces of equipment.

An embodiment describes synchronizing the movement of a video wall along a path with the video that is created for that video wall.

BRIEF DESCRIPTION OF THE DRAWINGS in the drawings.

DETAILED DESCRIPTION

Figure 1:
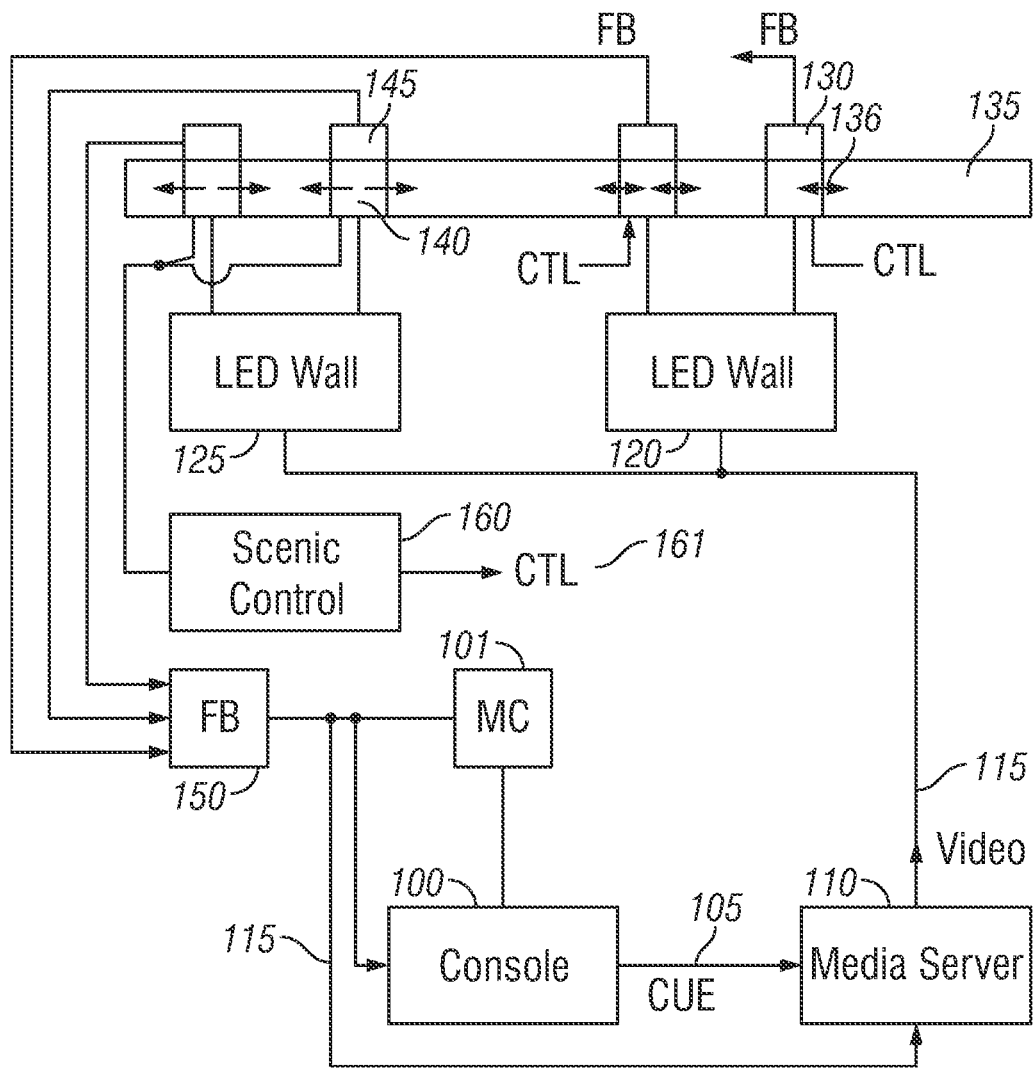
FIG. 1 shows a basic block diagram of a system.

FIG. 1 shows the basic block diagram of a system for synchronizing video with wall movement. According to an embodiment described herein, the system combines five major pieces.

A controlling console 100 may be the PRG V676™ console which produces outputs that can typically be used to control one or more moving lights shown generically as 101. The moving lights can be lights that are remotely controllable to move in pan and tilt directions, and to change aspects such as color and/or gobo. The console produces cue outputs 105 which are coupled to a media server 110. The media server in this embodiment can be the PRG's Mbox™.

The media server 110 also produces video output 115 which may be on one or multiple different output lines. In this embodiment, there are a number of video display panels shown as 120, 125. While only two video display panels are shown, any number of display panels can be controlled in this way. The video display panels used herein are shown as being LED panels or "walls", but can be any technology that displays images and/or video as pixels. Each video display panel such as 120 is mounted on a scenery winch assembly 130. The winch assembly moves along a truss 135 to enable moving the video wall in either direction shown as 136 along the truss 135. The video wall 125 also has a corresponding winch assembly 140. However, in another embodiment, one single winch can move both video walls 120, 125 together.

Each of the winch assemblies such as 140 includes a feedback module 145 which feeds back position indicative of its movement to a feedback accumulator 150.

A scenic/winch controller 160, e.g., the PRG Scenic Commander™ for the winch produces outputs which control the movement of the winches 130 and 140.

In operation, one of the computers in the system includes programming to carry out the functions described herein. In this embodiment, the programming can be in the console 100. The console 100 produces cues in the Art-Net format to indicate information about what should happen at a specified time during a show. These cues are based on programming by a lighting designer. The cues may indicate, for example, what movie or media the media player server 110 should be playing as video 115. The cues may also indicate the speed and other information about the media.

The scenic controller 160 produces output commands which move the video walls 120 and 125 in a specified way. In one embodiment, for example, the video walls may be moved in sync with one another either in the same direction or in opposite directions. The scenic control 160 communicates via the CTL line 161 with the console, to receive commands for the movement of the walls, e.g., from the console. As the video walls are moved, the FB accumulator 150 receivers information about that movement. The movement is used by programming in one of the computers to cause the media on those video walls to be correspondingly automatically moved in position as the panels move. The output to the video walls is created in a standard video protocol—VGA, DVI, or SDI typically. In one embodiment, the console can set the media server into a state whereby portions of the video imagery can respond to this feedback data from the automation system.

Figure 2:
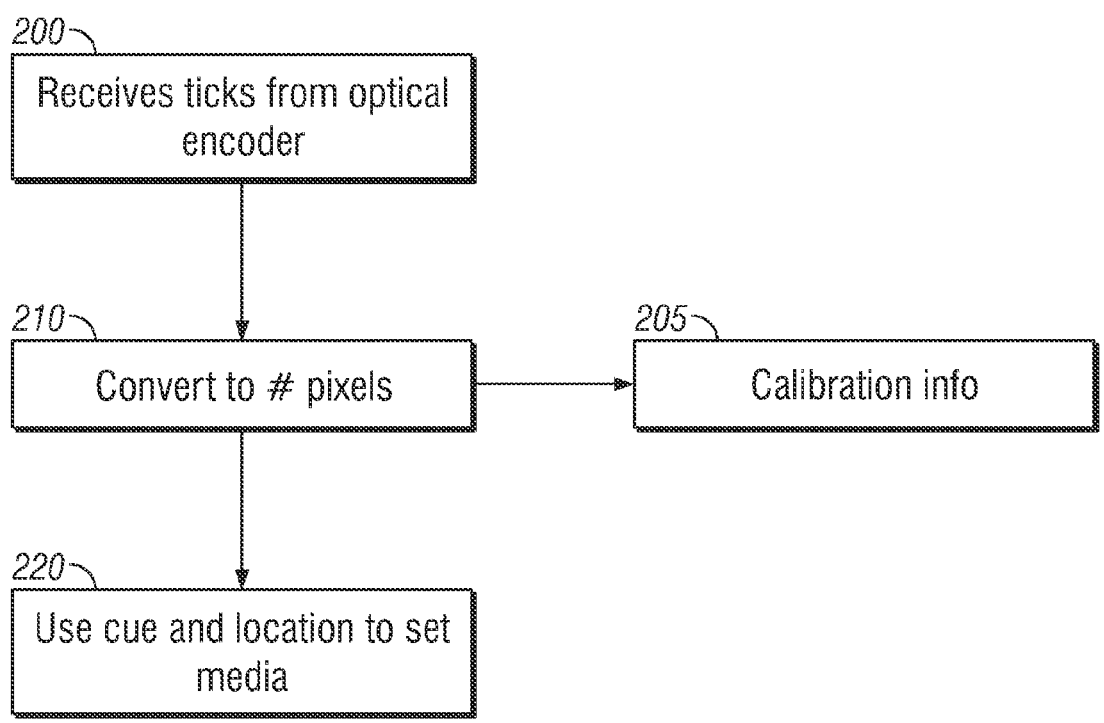
FIG. 2 shows a flowchart that is executed by different components of that system.

Each of the winches includes at least one encoder 145. The encoder, for example can be an optical encoder with a number of slits therein, where the slits periodically allow through a pulse of light as they move. Each pulse of light represents a specific amount of movement of the encoder. The pulse of light, herein referred to as a "count", is counted by a feedback mechanism 150. The feedback mechanism determines counts per unit time, and converts that to an ethernet command. A number of different counts from a number of different winches are counted. This is converted by a Galil interface box (www.galilmc.com) to a single ethernet output 155 which is coupled to the media server 110 (and/or console 100). In this way, the media server 110 receives data about the movement of the scenery. This is also shown in the flowchart of FIG. 2, where the media server receives counts from the optical encoder at 200. This can be done in multiple ways. This signal directly into one or more media servers, using an Ethernet switch to allow multiple connections. In another embodiment, a separate computer can be used as an intermediary device between the feedback accumulator and one or more media servers.

Note in this embodiment that the media server and console need not be connected to the scenic controller 160 that controls the winches. In fact, in one embodiment, the computer that is programmed to control the media is unconnected to the computer that controls the wall movement.

The media server 110 (or another computer in the system) converts the counts to a number of pixels at 210. For example, this may be based on a determination made in advance by calibration. The calibration information is shown as 205 in FIG. 2, and may be individual for each device or may be the same for all devices. As a round number, one may assume that 1000 counts equals 100 pixels on the screen for a specific optical encoder. However, other encoders can be used in a similar way. This calibration technique of converting optical encoder counts to pixels of movement can be used with any winch, any encoder and for movement in any direction (left, right, up, down, or at a diagonal) based on appropriate calibration. According to another embodiment, the encoder may send pulses and a direction, such as plus or minus, to a counting box. This may be done according to a set refresh time such as 300 Hz, or may update in real time each +4 minus holes as a message. the Galil box can accumulate accounts and send out an single numerical value at each of a number of refresh rates, such as 80 Hz.

The media server uses the cue 105 along with the feedback 155 to decide what, where and when to display on the LED wall at 220. For example, in one embodiment, the display on the LED wall is moved laterally exactly in sync with the movement of the LED wall. As the LED wall is moved, for example to stage right, the video looks like it is in the same place, by moving the video to stage left by one pixel each time the LED wall moves to its stage right by one pixel.

The two LED walls may move in opposite directions, with the projections on the LED walls appearing as though they stay in precisely the same place. For example, the projection may actually be a scene that is much wider than the LED wall, and the LED wall travels from side to side, projecting the entire LED walls and as though the projection itself stayed in the same place while the screen moves.

In an embodiment, the feedback from the winch system sends Ethernet to our computer (e.g., a PRG M Box® and/or M Box Extreme®) which then converts that feedback into ArtNet which is used for automatic cue creation to position the video on the screen. The position of the video is synchronized to the position of the panels. Art Net protocol is a protocol for creating and transmitting DMX-512 over Ethernet. See http://www.artisticlicence.com/WebSiteMaster/User%20Guides/art-net.pdf for the Art Net protocol. This is used for automatic placement or manipulation on the screen, where the video on the video panels is automatically synchronized to the movement of the panels.

Other kinds of motion that are achievable via automation and that might have a particular reaction from the media server: rotation around X, Y, or Z axes requiring counter-rotation of video image; upstage/downstage motion (distance from viewer) requiring scaling of image; rotation around X or Y axes requiring keystone compensation of image; rearrangement of scenic elements that creates a need for reconvergence of imagery from two or more projectors in order to produce a clear image, are just some of them.

Moreover, other sorts of motion are achievable via automation and that might have a particular reaction from the media server: rotation around x, y and z axes requiring counter-rotation of video image; upstage/downstage motion (distance from viewer) requiring scaling of image; rotation around X or Y axes requiring keystone compensation of image; rearrangement of scenic elements that creates a need for reconvergence of imagery from two or more projectors in order to produce a clear image.

More generally, movement need not be on a single axis, and potentially track items moving in 3D space.

Different kinds of protocols can be used for the link between Scenic Cmmdr and console 161. One example is the MIDI Show Control, but this an alternatively be some other proprietary signal format.

Another embodiment simulates a visualization without the actual scenery, where the movement controller and/or console manufactures the feedback data locally and sends this to the rest of the system, including the media server. This can be used to carry out pre-visualization to automatically place content from the media server onto the console's pre-vis image and to move correctly as the scenery on the pre-vis image moves. This can all be done without the actual scenery.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other stage operated and operable devices can be controlled in this way including winches and movable trusses, and moving light holders.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

A least one of storage mediums is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to computer system 550 from a network server via communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface A "computer readable medium" can be any media used to provide computer executable code (e.g., software and computer programs), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A lighting control device, comprising:
   a controller, that controls a display of a light image having plural pixels, on two separated remote lighting device,
   said controller producing an output that is used to control the display of the light image on the remote lighting devices, where the remote lighting devices are each remote from said controller and connected to said controller via a control link;
   wherein said light image has a size that is larger than an overall size of either remote lighting device;
   said controller receiving an input indicative of a movement of said controllable lighting devices, and produces an output which controls a position of said light image on said remote lighting devices, said output causing said position of said light image to automatically change to cause first portions of the image to be displayed on said controllable lighting device when said controllable lighting devices are at a first position, and a second portion of the image is not caused to be displayed on said controllable lighting device when said controllable lighting devices are at said first position, and when said controllable lighting devices move to a second position, to cause a viewed portion of said images to be in the same apparent location on said controllable lighting devices at said second position, and to cause a third portion of the image different than the first portion of the image, to be displayed on said controllable lighting devices when said controllable lighting device is at said second position, and a fourth portion of the image is not caused to be displayed on said controllable lighting devices when said controllable lighting devices are at said second position, and where the image is caused to be displayed in the same apparent location on said controllable lighting devices at all positions as said controllable lighting device, and a different portion of said image is displayed as said lighting device is moved,
   where the controllable lighting devices are moved in sync with one another, and where the image is correspondingly automatically moved in position as the controllable lighting devices move.

2. A device as in claim 1, wherein said controller receives feedback signals which are counts from encoders that monitor movement of the controllable lighting device and wherein said controller operates to convert each number of pulses to a number of pixels of the image, and to shift said image by the specified number of pixels for counts that are received.

3. A device as in claim 1, wherein said controller receives information indicative of actual movement of said controllable lighting devices.

4. The device as in claim 3, wherein said information indicative of actual movement of the controllable lighting device is in ethernet format over a single ethernet line.

5. The device as in claim 3, wherein said controller extracts information indicative of a number of pulses of an encoder from said information, and wherein said information also includes information about a direction of movement and converts said number of pulses to a number of pixels of movement, and shifts said image by a number of pixels on said lighting devices that maintains the apparent position of the displays at the same locations using the number of pixels of movement of said lighting devices to shift the images.

6. A device as in claim 1, wherein said two different lighting devices move in two different directions, and maintains parts of the image when seen to show the parts of the image at the same apparent position on each of said two lighting devices.

7. The device as in claim 2, wherein said two different lighting devices continually move in opposite directions while maintaining parts of the image when seen to show the image at the same apparent position and where said counts include an indication of a direction in which the two different lighting devices are moving.

8. The device as in claim 1, wherein said two different lighting devices move in the same direction.

9. The device as in claim 7, wherein said controller extracts information indicative numbers of pulses of encoders that are respectively monitoring movement of said two different lighting devices from said information, and converts said numbers of pulses to numbers of pixels of movement, and shifts said images by a number of pixels on said lighting device that maintains the apparent position of the display at the same location using the number of pixels of movement of said lighting device to shift the image.

10. A device as in claim 1, wherein said controller is a console for controlling a number of lighting devices that produces outputs indicative of images on a number of lighting devices.

11. A device as in claim 10, wherein said output to said controllable lighting device includes a cue.

12. A device as in claim 1, wherein said controller is a media server that produces outputs indicative of video, and where said image is a frame of said video.

13. A lighting control method, comprising:
    controlling a display of a light image on first and second LED walls;
    sensing movement of the LED walls by a moving winch;
    producing an output which controls a position of said light image on both of said first and second LED walls, said output causing said position of said light image to automatically change to cause said image to continually shift along said axis as said LED walls move, to cause said image to be in a same apparent location on said first and second LED walls at all positions as said LED walls move,
    wherein said light image has a size that is larger than an overall size of either LED wall, and wherein
    movement of said LED wall controls a position of said light image on said LED walls, said output causing said position of said light image to automatically change to cause a first portion of the image to be displayed on said LED wall when said LED wall is at a first position, and a second portion of the image is not caused to be displayed on said LED wall when said LED wall is at said first position, and when said LED wall moves to a second position, to cause a viewed portion of said image to be in the same apparent location on said LED wall at said second position, and to cause a third portion of the image different than the first portion of the image, to be displayed on said LED wall when said LED wall is at said second position, and a fourth portion of the image is not caused to be displayed on said LED wall when said LED wall is at said second position, and where the image is caused to be displayed in the same apparent location on said LED wall at all positions as said LED wall, and a different portion of said image is displayed as said LED wall is moved, where the controllable lighting devices are moved in sync with one another, and where the image is correspondingly automatically moved in position as the controllable lighting devices move.

14. The method as in claim 13, wherein a controller which carries out said controlling is not connected to a controller which controls said movement of said controllable light and receives a feedback signal from an encoder that monitors movement of the controllable lighting device, said feedback signal including counts from the encoder where each count represents a specified amount of movement of the encoder, and wherein said controlling comprises convert each number of pulses to a number of pixels of the image, and to shift said image by the specified number of pixels for counts that are received.

15. The method as in claim 13, wherein said receiving comprises receiving pulses indicative of a specified amount of actual movement of each said LED wall, and information indicative of a direction of movement of each said LED wall, and wherein said controlling comprises moving the image by a specified number of pixels based on pulses that are received.

16. The method as in claim 13, wherein said information indicative of actual movement of the LED wall is in ethernet format over a single ethernet line.

17. The method as in claim 15, further comprising extracting information indicative of a number of pulses of an encoder from said information, and converts said number of pulses to a number of pixels of movement, and shifting said image by a number of pixels on said lighting method that maintains the apparent position of the display at the same location using the number of pixels of movement of said LED wall to shift the image.

18. A method as in claim 13, wherein said two different LED walls move in two different directions, and maintains images at the same apparent position on each of said two LED walls.

19. The method as in claim 18, wherein said two different LED walls continually move in opposite directions while maintaining the images at the same apparent positions and where said counts include an indication of a direction in which the two different LED walls are moving.

20. The method as in claim 19, wherein said two different LED walls move in the same direction.

21. The method as in claim 19, wherein said controller extracts information indicative numbers of pulses of encoders that are respectively monitoring movement of said two different LED walls from said information, and converts said numbers of pulses to numbers of pixels of movement, and shifts said images by a number of pixels on said LED walls that maintains the apparent position of the display at the same location using the number of pixels of movement of said LED walls to shift the image.

22. A method as in claim 13, wherein said controlling is carried out in a console for controlling a number of LED walls that produces outputs indicative of images on a number of LED walls.

23. A method as in claim 22, wherein said output to said LED wall includes a cue.

24. A method as in claim 13, wherein said controlling is carried out in a media server that produces outputs indicative of video, and where said image is a frame of said video.

25. A lighting control device, comprising:
a controller, that controls a display of a light image having plural pixels, on a remote lighting device, and which produces an output that is used to control the display of the light image on the remote lighting device, where the remote lighting device is remote from said controller and connected to said controller via a control link;
said controller receiving an input indicative of a movement of said controllable lighting device in a direction which changes its distance from a viewer, and produces an output which controls a scaling of said light image on said remote lighting device, said output causing said scaling of said light image to automatically change based on distance from the viewer as said controllable lighting device moves along said direction.

* * * * *